UNITED STATES PATENT OFFICE.

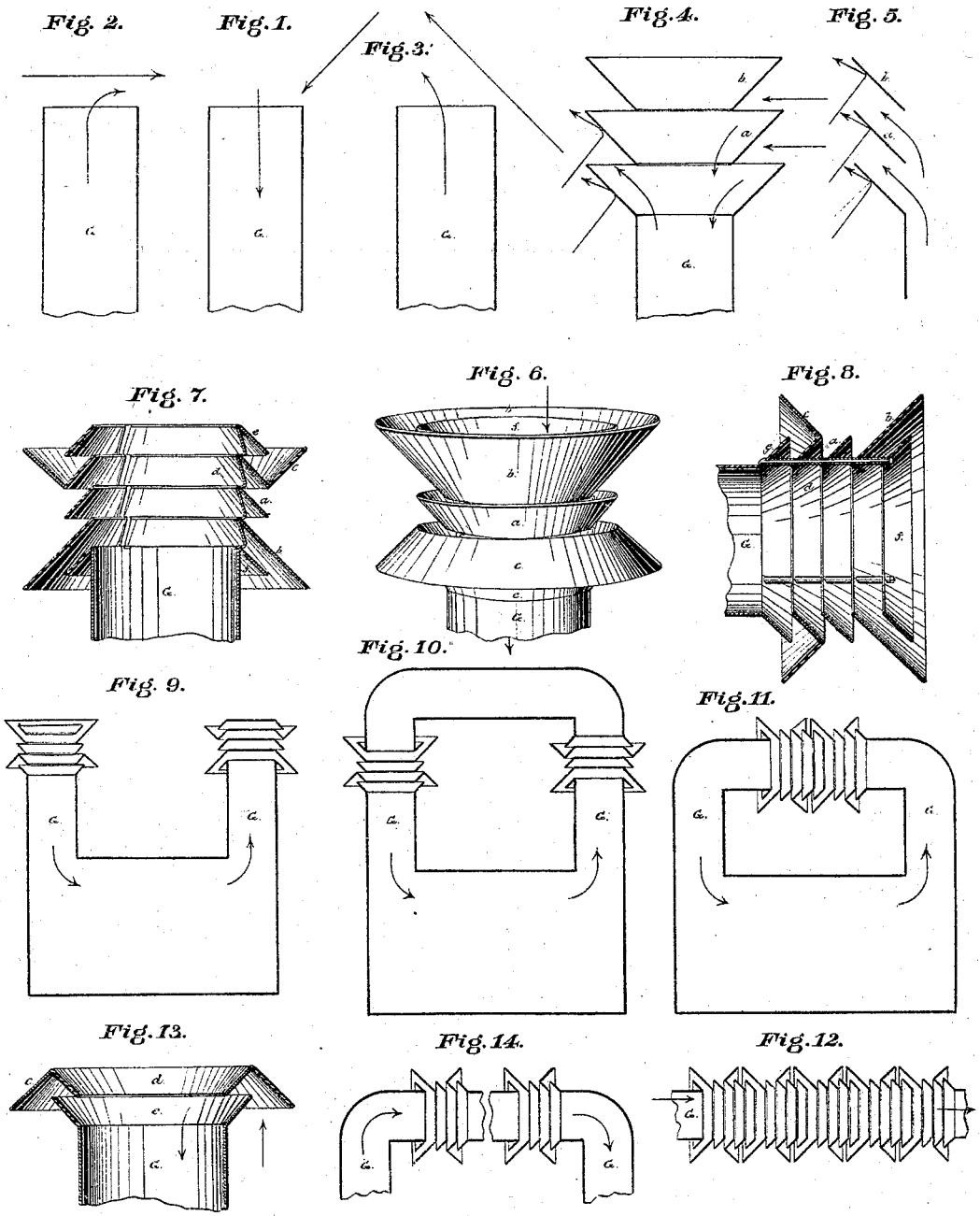

JOHN H. IRWIN, OF PHILADELPHIA, PENNSYLVANIA.

IMPROVEMENT IN ATMOSPHERIC INJECTORS FOR VENTILATING.

Specification forming part of Letters Patent No. 150,958, dated May 19, 1874; application filed April 30, 1874.

*To all whom it may concern:*

Be it known that I, JOHN H. IRWIN, of Philadelphia, in the county of Philadelphia and State of Pennsylvania, have invented a new and useful Improvement in Atmospheric Injectors; and I do hereby declare the following to be a full, clear, and exact description of the same, reference being had to the accompanying drawings, in which—

Figures 1, 2, 3, 4, 5, are diagrams to represent the action of deflectors. Fig. 6 is a perspective view of my injector in operative position. Figs. 7 and 8 are longitudinal sections of the same in different positions. Figs. 9, 10, 11, 12, and 14 are diagrams representing my injector arranged to produce a ventilating-circuit. Fig. 13 represents, in longitudinal section, that part of my invention which reverses upward currents.

The proper ventilation of buildings, ships, mines, &c., generally depends, especially in case of ships and mines, upon a compulsory influx of fresh air from without, or an equally compulsory exhaustion of air from within—in either case the compulsory current in the one direction being the cause of the necessary balancing current in the other direction. Various devices have been contrived for the purpose of compelling the natural atmospheric currents either to pass into and down a flue into the apartment to be ventilated, or to induce a current outward therefrom, the place of which would then be supplied by natural currents impelled by atmospheric pressure. The difficulties in producing the desired result are due to the irregularities of the natural atmospheric currents.

My invention relates to that class of ventilating apparatus which is intended to control natural atmospheric currents, and cause them to flow in the desired direction; and it consists in a novel combination and arrangement of deflecting surfaces, whereby, whatsoever may be the direction of the atmospheric current, it will be deflected and caused to move in the direction of the axis of the deflector.

After a series of experiments, I am satisfied that the definite proportion and structure of my apparatus herein described will produce the best result; still I do not design to confine myself rigidly to said proportions and arrangements, because similar, and, in some cases, undistinguishable, results may be obtained by different arrangements of parts, having similar functional qualities.

That others may fully understand my invention, I will particularly describe it.

For convenience I will only describe my apparatus arranged as an injector.

G is the pipe or flue through which it is desired to inject a current of air with a uniform direction.

It is well known that atmospheric currents seldom move in horizontal lines, that they are constantly being deflected and disturbed by stationary objects or other air-currents, and that they move with downward as well as upward inclinations. If, as in Fig. 1, the air-current encounters the open end of the flue G, a downward current therein may be established; but if a like current blows horizontally or obliquely upward across the end of said flue, as in Figs. 2 and 3, then an upward and outward current will be established through said flue. Such flue would be at one time an injector, and at another time an ejector, and this uncertainty would destroy its usefulness as a means of supplying an air-current uniformly in one direction. Air-currents moving in horizontal or downward directions may be diverted or caused to enter the flue by means of plates disposed with thin deflecting surfaces projected upward and outward, as *a b;* but if the air-current has an upward inclination, as in Fig. 5, then the same plates *a b* deflect the current outward, and an upward or exhaust-current is induced in the flue. To counteract this effect of currents having an ascending inclination, I place a plate having a double deflecting surface, *c d*, the inner one, *d*, parallel with plates *a b*, and the outer one including an angle of about ninety (90) degrees thereto, and within the angular space thus inclosed another plate, *e*, also parallel with *a b d*.

It will be observed that any air-current moving upon plates *a b* with an obliquity thereto of less than ninety degrees, measuring from the outer edge, will be deflected and caused to enter into the flue A, while, if the inclination of said current is more than ninety degrees it will be caught under the plate *c*, and, being deflected upon plate *d*, will thereby be again deflected into the said flue. The plate *e* serves to project and guard said upward and deflected current from interference with the undeflected portion of said current.

Having now set forth the general form and function of the separate parts of my apparatus, I will describe the form and projections of its parts, which my experiments have shown to produce the most satisfactory results.

The plate *a* is a frustum of a cone, whose sides are inclined to the base at angles of forty-five degrees, and the areas of base and apex of said frustum are as two to one. The plates *d* and *e* are exactly similar to plate *a*. Plate *b* is similar as to form, but is a frustum of similar area at apex, but more than twice the altitude of *a*, so that said base is to apex an excess of four to one. The superficial area of the reversed plate *c d* is equal to the area of plate *b*. These plates are supported upon rods *g* or other similar supports, which will offer but slight obstruction to the air-currents. They are placed, as relates to each other, so that the apex of one conic frustum is on or very nearly on the horizontal plane of the base of the next adjacent frustum. Within the plate *b* it is advantageous to place a plate, *f*, corresponding in size, obliquity, and relative position to plates *a e*. The described arrangement is shown in Fig. 6. Whatever may be the direction of the wind, this apparatus will cause a current of air to be injected into the flue G. This is the primary current, and it also causes an induced current in the same direction. If it be desired to produce an outward or exhaust current in the flue G, it is only necessary to reverse the positions of the deflecting plates, as shown in Fig. 7, and the induced current will then always be outward. The effect is the same whether the axis of the apparatus is inclined horizontally or vertically.

An efficient arrangement for ventilating consists of an injector and ejector placed in connection with the same apartment, as in Fig. 9, so that while one is, so to speak, exhausting the air, the other is with equal force injecting air, and thus, by the application of force at each end of the circuit, ventilation is made easy, uniform, and continuous, whatever may be the direction of the atmospheric currents. If the injector and ejector are connected, as in Fig. 10 or 11, the operation is made completely uniform, because then any air-current which effects the one also effects the other directly, which would not always be the case if they were not so connected. If the series of injectors be made continuous, as Fig. 12, the effect is intensified, and a larger volume of air injected and exhausted. The length of said series may be extended indefinitely.

Having described my invention, what I claim as new is—

1. The reversing-plates *c d*, combined with the plate *e*, for the purpose of catching and reversing the direction of atmospheric currents, as set forth.

2. The reversing-plates *c d* and plate *e*, combined with the deflecting-plates *a b f*, to constitute an atmospheric injector, as set forth.

3. The plates *a b c d e f*, severally constructed of the form and proportions, and relatively placed, in the manner set forth, to form an atmospheric injector or ejector, as set forth.

4. The combination of two or more injectors in a series, substantially as shown in Figs. 10, 11, 12, and 14, and for the purpose described.

J. H. IRWIN.

Witnesses:
SAML. L. THOMPSON,
CHAS. F. R. HENCKEROTH.